US007993708B2

(12) United States Patent
Evans et al.

(10) Patent No.: US 7,993,708 B2
(45) Date of Patent: Aug. 9, 2011

(54) CONTROL FOR REFORMER, FUEL CELL AND BATTERY MANAGEMENT SYSTEM IN A STATIONARY POWER PLANT

(75) Inventors: Craig Evans, Portland, OR (US); Steve Ernst, Portland, OR (US); Evan Rege, Portland, OR (US)

(73) Assignee: ClearEdge Power, Inc., Hillsboro, OR (US)

( * ) Notice: Subject to any disclaimer, the term of this patent is extended or adjusted under 35 U.S.C. 154(b) by 169 days.

(21) Appl. No.: 12/166,133

(22) Filed: Jul. 1, 2008

(65) Prior Publication Data

US 2010/0003558 A1    Jan. 7, 2010

(51) Int. Cl.
*H01M 8/06* (2006.01)
*H01M 8/18* (2006.01)

(52) U.S. Cl. ........ 427/427; 429/408; 429/416; 429/423; 429/425

(58) Field of Classification Search ...................... 429/19
See application file for complete search history.

(56) References Cited

U.S. PATENT DOCUMENTS

| | | | |
|---|---|---|---|
| 6,048,473 A * | 4/2000 | Denda et al. ................... | 252/376 |
| 6,495,277 B1 | 12/2002 | Edlund et al. | |
| 2002/0046889 A1 | 4/2002 | Kunitake et al. | |
| 2002/0175657 A1* | 11/2002 | Leboe ........................... | 320/132 |
| 2003/0206424 A1* | 11/2003 | Jungreis et al. ............... | 363/125 |
| 2004/0083039 A1* | 4/2004 | Hunt et al. ..................... | 701/22 |
| 2005/0014043 A1* | 1/2005 | Kozu et al. ..................... | 429/22 |
| 2006/0052916 A1* | 3/2006 | Hoch et al. ..................... | 701/22 |
| 2006/0204412 A1* | 9/2006 | Rizzo et al. ................... | 422/198 |
| 2007/0190380 A1 | 8/2007 | DeVries | |

OTHER PUBLICATIONS

ISA European Patent Office, Search Report of EP 2 141 762, Nov. 11, 2009, Germany, 2 pages.

* cited by examiner

*Primary Examiner* — Basia Ridley
*Assistant Examiner* — Sean P Cullen
(74) *Attorney, Agent, or Firm* — Alleman Hall McCoy Russell & Tuttle LLP (57) ABSTRACT

A method of operating a power generating system including a fuel cell coupled to an electrical buffer, wherein the fuel cell is further coupled to a steam reformer, comprising adjusting operation of the reformer based on a voltage affected by the electrical buffer while maintaining a steam to carbon ratio of the reformer to control charging of the electrical buffer by the fuel cell.

16 Claims, 5 Drawing Sheets

CONTROL FOR REFORMER, FUEL CELL AND BATTERY MANAGEMENT SYSTEM IN A STATIONARY POWER PLANT

BACKGROUND AND SUMMARY

Electricity can be generated at stationary power plants from hydrogen-enriched raw fuel upon oxidation in a fuel cell stack wherein a plurality of fuel cells are bundled together. Control systems that monitor flow through and output from reformers and fuel cell stacks can facilitate power plant management during power output fluctuations, for example buffer systems in the form of batteries and/or super-capacitors, may be employed to safeguard the power plant components from such transients.

Maintenance of electron flow through a fuel cell circuit can be achieved by ensuring a continued presence of hydrogen on the anode side where it dissociates into protons and electrons in the presence of an anode catalyst. In the absence of hydrogen, the integrity of the fuel cell may be compromised. Thus in one approach to power plant management, a large anode inventory of hydrogen is ensured by the usage of large fuel cell stacks. However, the inventors have herein recognized this may generate a need for large amounts of fuel and corresponding large areas to house the fuel.

Since the power, and therefore the current, drawn from a fuel cell impacts the extent of losses incurred, and consequently the efficiency of the fuel cell, it is also desirable to maintain the power output from a fuel cell stack. Additionally, fuel cell activation losses can contribute to output voltage decreases. Thus, in another approach to power plant management, a control system is incorporated to adjust reformer capacity in response to the current drawn from the fuel cell stack. Adjustments in reformer capacity by variation of input raw fuel and steam amounts allows for adjustments in the level of hydrogen-enriched fuel that enters the fuel cell stack. However, the inventors herein have also recognized a disadvantage with such an approach. Specifically, the response time involved in the adjustment of the reformer's water and fuel flow rates, adjustment of steam air blower speeds, and regulation of system temperature levels, can often be longer than desired. Late response times can lead to component damage due to a temporary insufficiency in the levels of hydrogen on the anode side of the fuel cell, even if sufficiently large amounts of fuel storage are utilized. The damage may be exacerbated in case of transient fluctuations.

In one approach, the above issues may be addressed by a method of operating a power generating system including a fuel cell coupled to an electrical buffer, where the fuel cell is further coupled to a steam reformer. The method may comprise adjusting operation of the reformer based on a voltage affected by the electrical buffer while maintaining a steam to carbon ratio of the reformer to control charging of the electrical buffer by the fuel cell. For example, the method may comprise compensating for increased power demand by providing current from the electrical buffer before the fuel cell current is increased by the adjustment of the reformer.

In this way, by adjusting the reformer responsive to the voltage, the reformer can lead the system in response to voltage disturbances. Thus, an electrical buffer may be used to compensate the demand during transient conditions (e.g., for ancillary devices such as pumps, blowers, etc. to react), rather than relying on a large buffer of fuel, for example, to reduce the likelihood of insufficient fuel at the anode.

It should be understood that the above description is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
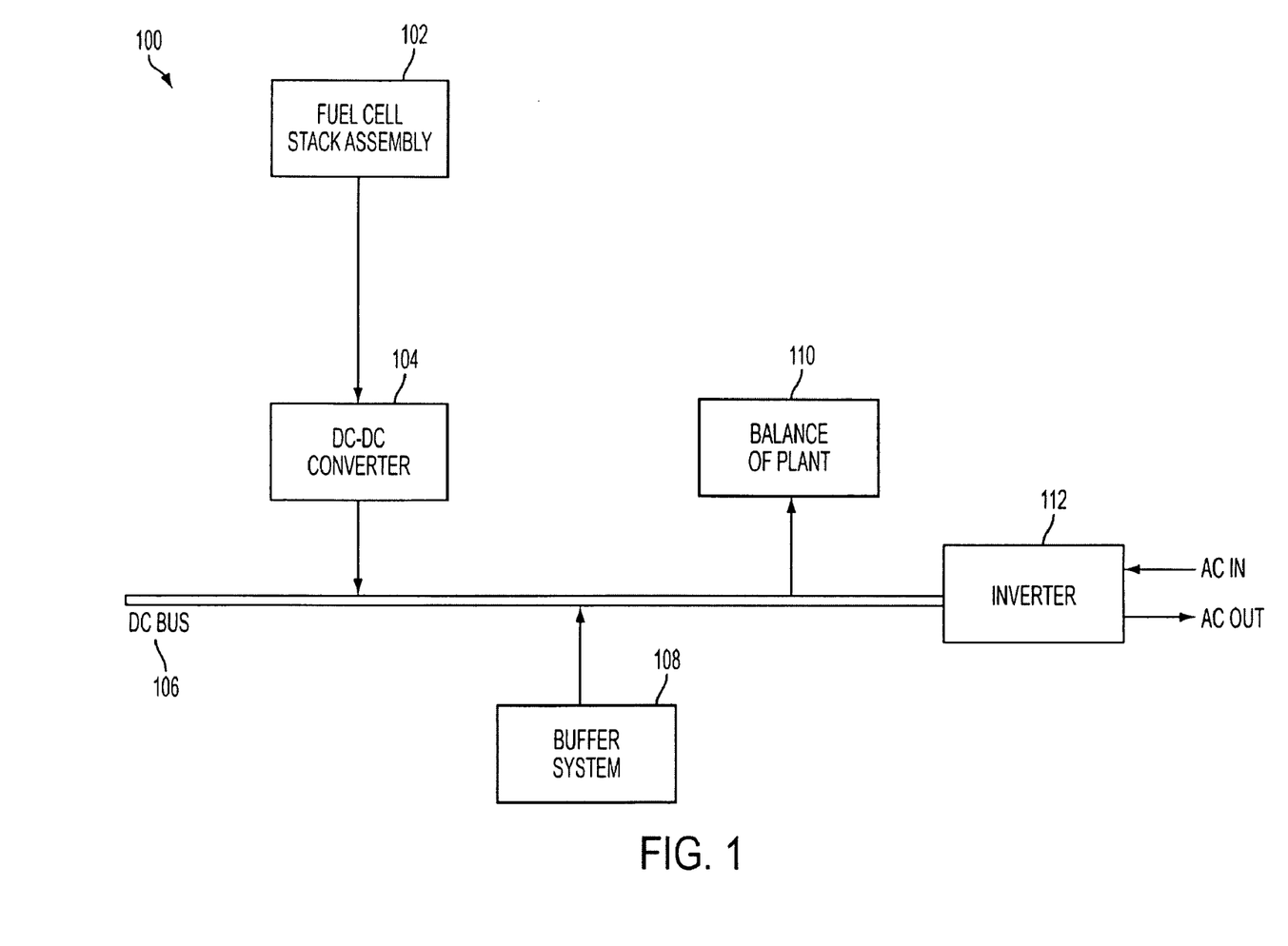
FIG. 1 shows a schematic diagram of an embodiment of a stationary power plant.

FIG. 1 shows an embodiment of stationary power plant 100 (herein after referred to as "power plant 100") that generates power from hydrogen-enriched raw fuel using fuel cell technology. The stationary power plant comprises fuel cell stack assembly 102 that communicates with DC-DC converter 104 prior to conveying power to DC bus 106. The DC-DC converter 104 may comprise a part of a control system as described in the present disclosure.

Power plant 100 comprises buffer system 108, examples of which include, but are not limited to, an electronic voltage/current buffer, a battery or group of batteries, super-capacitors, or combinations thereof. The balance of plant 110 includes the remaining components, structures and systems that comprise the power plant such as equipment required for the safe operation and technical coordination of all parts of a power plant. Examples of this include, but are not limited to, main and auxiliary transformers, cranes and turbines. DC bus 106 feeds into inverter 112 that converts the DC power input generated by power plant 100 into AC power output for subsequent transmission. In one embodiment of power plant 100, buffer system 108 may be charged by the AC power input from inverter 112 if the power generated by fuel cell stack assembly 102 does not suffice.

Since the power plant control system described in the present disclosure may be primarily configured to maintain a predetermined system battery voltage, it may respond to fluctuations in the system battery voltage by appropriately regulating a component, or various components of the power plant, in a coordinated manner such that the battery voltage is restored to the desired value. In the event of a lack of responsiveness of a component (or multiple components) of the power plant to the correction as determined by the controller, the above mentioned embodiment allows for the inverter to use the AC power input, for example from a grid, to charge the system battery and return it to the desired value.

Figure 2:
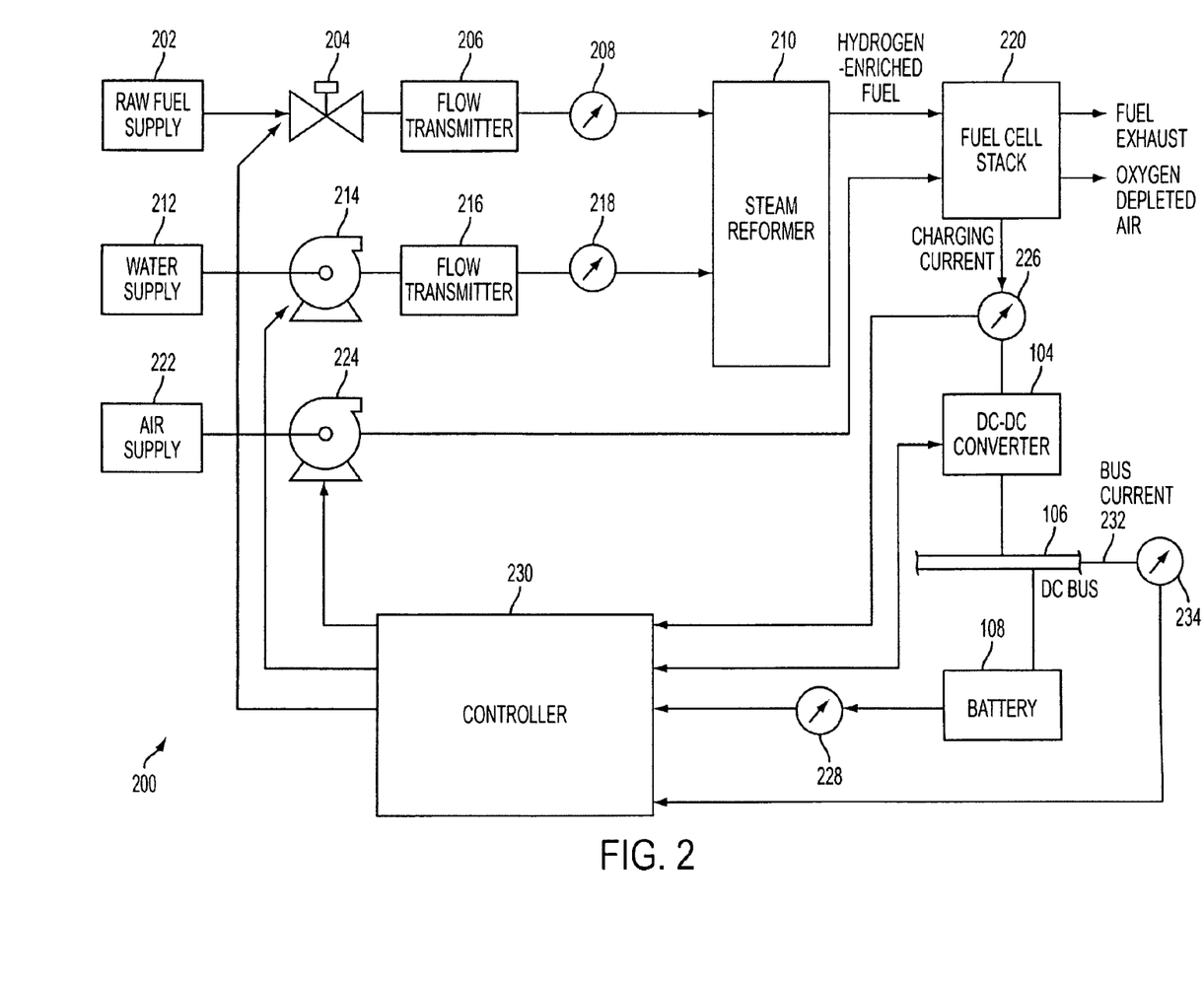
FIG. 2 shows a schematic diagram of an embodiment of a stationary power plant control system according to the present disclosure.

FIG. 2 depicts additional details of a power plant control system 200, including power plant 100 in one embodiment. The system may include fuel cell stack assembly 102, which comprises a raw fuel supply 202 that feeds into a steam reformer 210. The embodiment described herein may be used with various suitable raw hydrocarbon fuels. Suitable raw fuels may include, but are not limited to, biodiesel, vegetable oils, natural gas, etc. Accordingly, the reformer 210 may be configured to form hydrogen gas from a raw hydrocarbon using steam.

The system may further include fuel flow control device 204 that adjusts the flow of raw fuel through the flow transmitter 206 into steam reformer 210. The fuel flow control device may include various suitable component or components. Examples include, but are not limited to, a fuel valve (as depicted). The rate of flow may be monitored by a fuel flow meter 208 and communicated to electronic controller 230. Adjustments to fuel flow may be controlled by the electronic controller 230 based on inputs received from a multitude of power plant components, such as based on a desired fuel flow rate and a measured fuel flow and as described in further detail herein.

Steam used for hydrogen-enrichment in the reformer 210 is generated from water supply 212. Water flow control device 214 adjusts the flow of steam or water through the flow transmitter 216 into steam reformer 210. The water flow control device may include various suitable components. Examples include, but are not limited to a blower, water feed pump (as depicted) or combinations thereof. The rate of flow may be monitored by a water flow meter 218 and communicated to electronic controller 230. Adjustments to water flow may also be controlled by electronic controller 230 based on various operating conditions, such as based on desired water flow and the monitored water flow and as described in further detail herein.

Hydrogen-enriched fuel generated by steam reformer 210 is subsequently transferred to fuel cell stack 220. Fuel cell stack 220 may include a plurality of fuel cells coupled together, and uses air provided by air supply 222 for oxidation of the hydrogen-enriched fuel. Air flow control device 224 controls the flow of air into the fuel cell stack 220. The air flow control device 224 may include various suitable components. Examples include, but are not limited to, a blower (as depicted). Adjustments to air flow may also be controlled by electronic controller 230 responsive to various operating conditions, including a desired air flow and a measured air flow. Generation of charging current from the fuel cell stack 220 additionally yields fuel exhaust and oxygen depleted air, as shown.

The charging current is measured by a current measurement device 226 prior to communication with the DC-DC converter 104. The DC-DC converter may include a maximum current limit, beyond which converter enters into a current control mode. Further, the DC-DC converter may have a set voltage limit, such as 53V in one example, below which the output voltage may float.

Following passage through the DC-DC converter, the power generated by power plant 100 is transferred to DC bus 106, from where it may be subsequently transmitted. A buffer system 108, as described in FIG. 1, herein depicted as, and henceforth referred to as, a battery, is included in the power plant. While acid-type batteries may be used in this example, the buffer system may be comprised of other types of batteries, in various combinations. A battery voltage measurement device 228 may determine the voltage of the buffer battery and relay the information to the electronic controller 230.

The controller may also receive inputs regarding the charging current drawn from the fuel cell stack from the current measurement device 226, as well as inputs regarding the bus current 232 from a bus current measurement device 234. The controller may make adjustments to the flow rates of air, raw fuel and water, either independently or in combination, based on the entirety of data received. Various methods may be used, either independently or in combination, for controlling fuel cell stack operation, such as described in FIGS. 3-5, for example.

Figure 3:
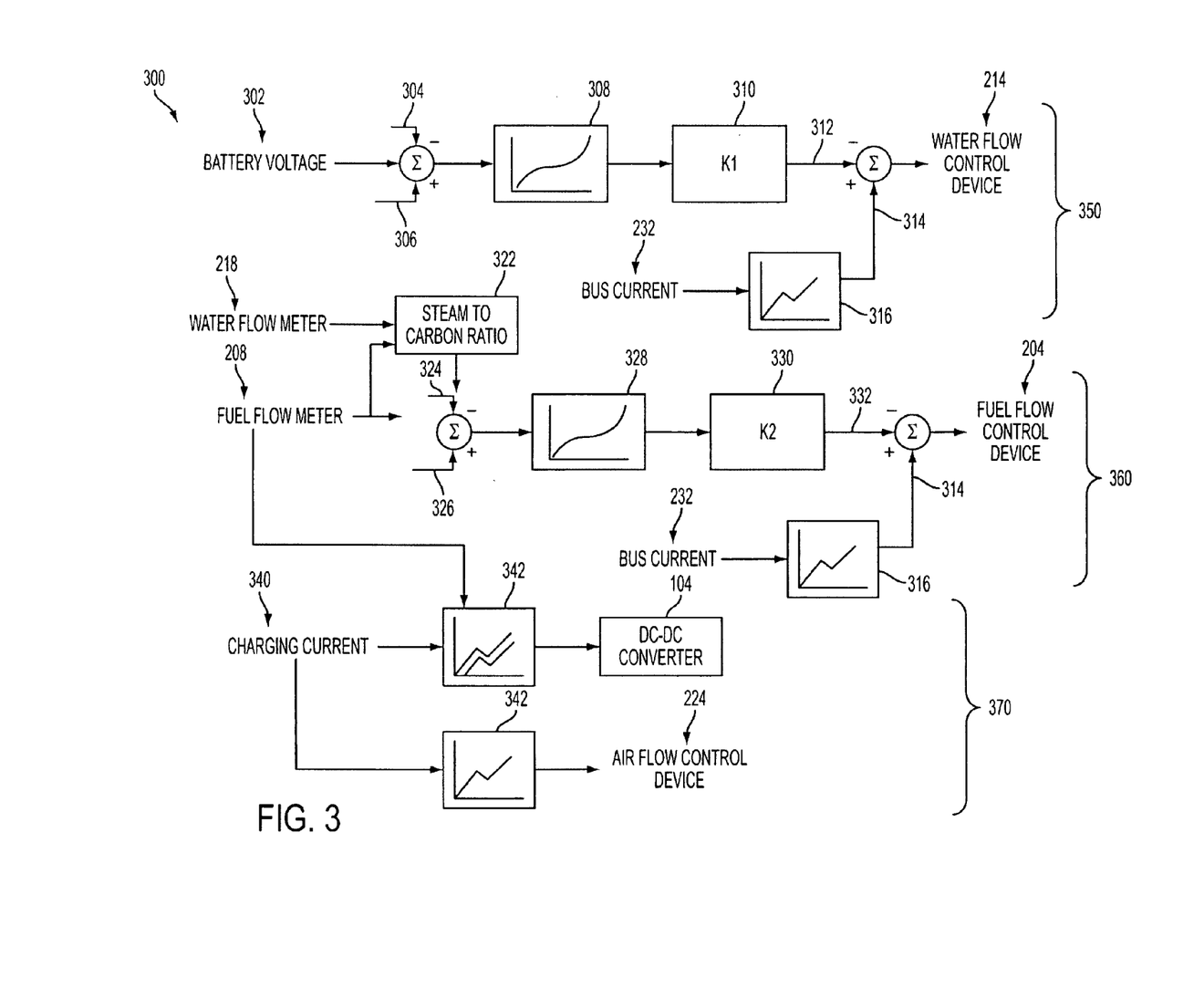
FIG. 3 shows a detailed schematic representation of the embodiment of the stationary power plant control system illustrated in FIG. 2.

Specifically, FIG. 3 shows an embodiment of a control system 300 to regulate power generation at power plant 100 according to the present disclosure. In one aspect of the embodiment, the control system may be used to control the operation and output of a fuel cell stack in a stationary power plant that generates power using fuel cell technology. The constituent inputs that feed into the control system and corresponding output components affected are depicted.

A first control routine is depicted at 350 which controls reformer operation responsive to battery voltage using a first controller 310. In particular, an indication of battery voltage 302 may be obtained from voltage measurement device 228. The measured battery voltage 304 is compared to a predetermined voltage set-point 306. For example, in one aspect of the routine, it has been determined by the inventors that the desired system battery voltage, as also the bus voltage, is 53V (e.g. for the voltage set-point 306). The error, or deviation, of the measured battery voltage from the set-point 306 is fed to lookup table 308 which has a non-linear gain function. In one example, the non-linear gain function may be of the form $$E = \frac{1}{2}[\alpha e^{\beta x} - \gamma e^{\psi x}]$$

where x is the error from set-point 306, and E is the adjusted error computed from measured error x following appraisal by lookup table 308. The remaining variables may be tuned based on desired performance and experimental testing. While this example shows the use of the sinh function, various other non-linear functions may be used, such as a bi-linear gain, etc. The output from the lookup table is fed to controller 310 labeled graphically K1. In one example, controller K1 may include a proportional-integral-derivative controller (herein after referred to as "PID controller K1") 310 integrated into the electronic control system 230 to appropriately generate a command signal responsive to the error that, in this example, adjusts the water flow control device 214. While this example shows a PID controller, various other control structures may be used, including non-linear controllers, gain-scheduling controllers, adaptive controllers, state-space controllers, etc. In this way, feedback control of the battery voltage is provided, wherein the response of the controller can be adjusted by varying the gains of the PID controller to achieve a desired response to control errors caused by disturbances or changes in the voltage set-point.

Additional feed-forward control may be provided in routine 350 based on the measured bus current so as to better anticipate various system interactions and more accurately maintain the desired system battery voltage (or bus voltage) for e.g. 53V, as described earlier. The bus current 232 is measured by bus current measurement device 234 and analyzed against lookup table 316. Based on the deviation 314 of this current from a desired current set-point value, and the input 312 from controller K1 310, appropriate adjustments may be made to the water flow rate by regulating the water flow control device 214. This allows regulation of the rate of steam flowing into the reformer, thereby altering the reformer capacity. Thus, a combination of a feedback control loop responsive to battery voltage and a feed-forward control mechanism responsive to bus current leads to adjustments in reformer 210 operation so as to consequently restore system battery voltage closer to the desired value, as described in further detail herein.

A second control routine is depicted at 360, which operates in parallel to the first control routine 350. The water flow rate 320, specifically the rate of steam flow into the reformer as determined by water flow meter 218, and the fuel flow rate, specifically the rate of fuel flow into the reformer as determined by fuel flow meter 208, provide data so that the controller can estimate a steam to carbon ratio 322 which indicates the ratio of steam to raw fuel (hydrocarbon). If a deviation in the estimated steam to carbon ratio 324 from the steam to carbon ratio set-point value 326 is identified, the error is fed to lookup table 328 which also has a non-linear gain function. In one example, the non-linear gain function may be of the form $$E = \frac{1}{2}[\alpha e^{\beta x} - \gamma e^{\psi x}]$$

where x is the error from set-point 326 and E is the adjusted error computed from measured error x following appraisal by lookup table 328. The remaining variables may be tuned based on desired performance and experimental testing. While this example shows the use of the sinh function, various other non-linear functions may be used, such as a bi-linear gain, etc. The output from the lookup table is fed to controller 330 labeled graphically K2. In one example, controller K2 may also include a PID controller (herein referred to as "PID controller K2") 330 integrated into the electronic control system 230 to appropriately generate a command signal responsive to the error that, in this example, adjusts the fuel flow control device 204. While this example shows a PID controller, various other control structures may be used, including non-linear controllers, gain-scheduling controllers, adaptive controllers, state-space controllers, etc. In this way, feedback control of the steam to carbon ratio is provided, wherein the response of the controller can be adjusted by varying the gains of the PID controller to achieve a desired response to control errors caused by disturbances or changes in the desired steam to carbon ratio.

Additional feed-forward control may be provided in routine 360 by the measured bus current so as to better anticipate various system interactions and more accurately maintain the desired system battery voltage (or bus voltage), for e.g. 53V, as described earlier. The bus current 232, as determined by bus current measurement device 234, is fed to lookup table 316. Based on the deviation 314 of this current from a desired current set-point value, and the input 332 from controller K2 330, further adjustments may be made to the fuel flow rate by appropriately adjusting the fuel flow control device 204. Thus, a combination of a feedback control loop responsive to the steam to carbon ratio and a feed-forward control mechanism responsive to bus current leads to adjustments in reformer 210 operation and consequent fuel cell stack 220 operation so as to restore the desired steam to carbon ratio. In this way, control routines 350 and 360 can provide coordinated feedback control of the battery voltage and steam to carbon ratio responsive to feedback from fuel cell stack operating data. Furthermore, they can provide feed-forward control responsive to bus current. In doing so, the control system allows the reformer capacity to be adjusted in accordance with the fuel cell stack capacity and system demand by advantageously using the electrical buffer system 108.

FIG. 3 further illustrates a third control routine 370 that operates with a feed-forward structure responsive to the charging current drawn at power plant 100. Specifically, the charging current 340 drawn from the fuel cell stack 220 is measured by current measurement device 226 and fed to lookup table 342. Lookup table 342 may also receive data input from the fuel flow meter 208 regarding the fuel flow rate. Based on the data received, the lookup table analyzes and assigns a maximum limit to the current that can be drawn from the fuel cell stack. This assigned value is then fed to the DC-DC converter, which, as noted above, operates in a current control mode to maintain the current below this maximum value.

Additionally, still further feed-forward control may be used to adjust the air flow control device 224 responsive to the charging current. In this way, an appropriate adjustment to the fuel cell stack capacity may be performed in order to bring the charging current value closer to desired operating condition, and below the designated maximum permissible limit, for example.

In another aspect of routine 370, if the current drawn is greater than the maximum permissible value, the DC-DC converter may operate to limit current, while the control system operates to accordingly adjust the maximum permissible current that can be drawn from fuel cell stack 220. The control system may subsequently affect reformer and fuel cell stack capacities via PID controllers K1 310 and K2 330 in routines 350 and 360, thereby initiating adjustments to the water flow control device 214 and fuel flow control device 204 as described herein. In another example, if the battery voltage is ascertained to be higher than the desired set-point, the controller may adjust the water flow control device and fuel flow control device in a manner to reduce the capacity of the reformer, and consequently that of the fuel cell stack, thereby reducing the charging current drawn from the system and allowing the system battery voltage to be restored to, or closer to, the desired set-point.

In this way, the present application integrates a voltage-responsive control system into power plant 100, wherein a series of routines, as described in FIG. 3, can be initiated in parallel, or in tandem, so as to allow for improved reformer and fuel cell stack capacities. Furthermore, the cascaded structure of the routines may allow for a rapid and enhanced coordination of the control system. In one example, events initiating a change in steam flow to the reformer in routine 350 may alter the steam to carbon ratio of the reformer consequently also affecting the fuel flow to the reformer in routine 360. In another example, events leading to alteration of reformer capacity in routine 360 may also lead to a change in the charging current 340 drawn from the fuel cell stack 220 (by affecting the fuel cell stack capacity), thereby altering the fuel cell stack air flow rate in routine 370. In yet another example, a change in the charging current drawn from fuel cell stack 220 may alter the system battery voltage such that the control system operates to subsequently address reformer and fuel cell stack capacity. By using cascading control routines and the electrical buffer, the power plant control system may better manage reformer capacity to anticipated conditions, thereby providing the fuel cell stack with sufficient hydrogen-enriched fuel. The cascading control routines may also permit functional synchronization of reformer and fuel cell stack capacities, thereby allowing for improvement in the plant's power generating capacity under the existing power plant operating conditions.

Figure 4:
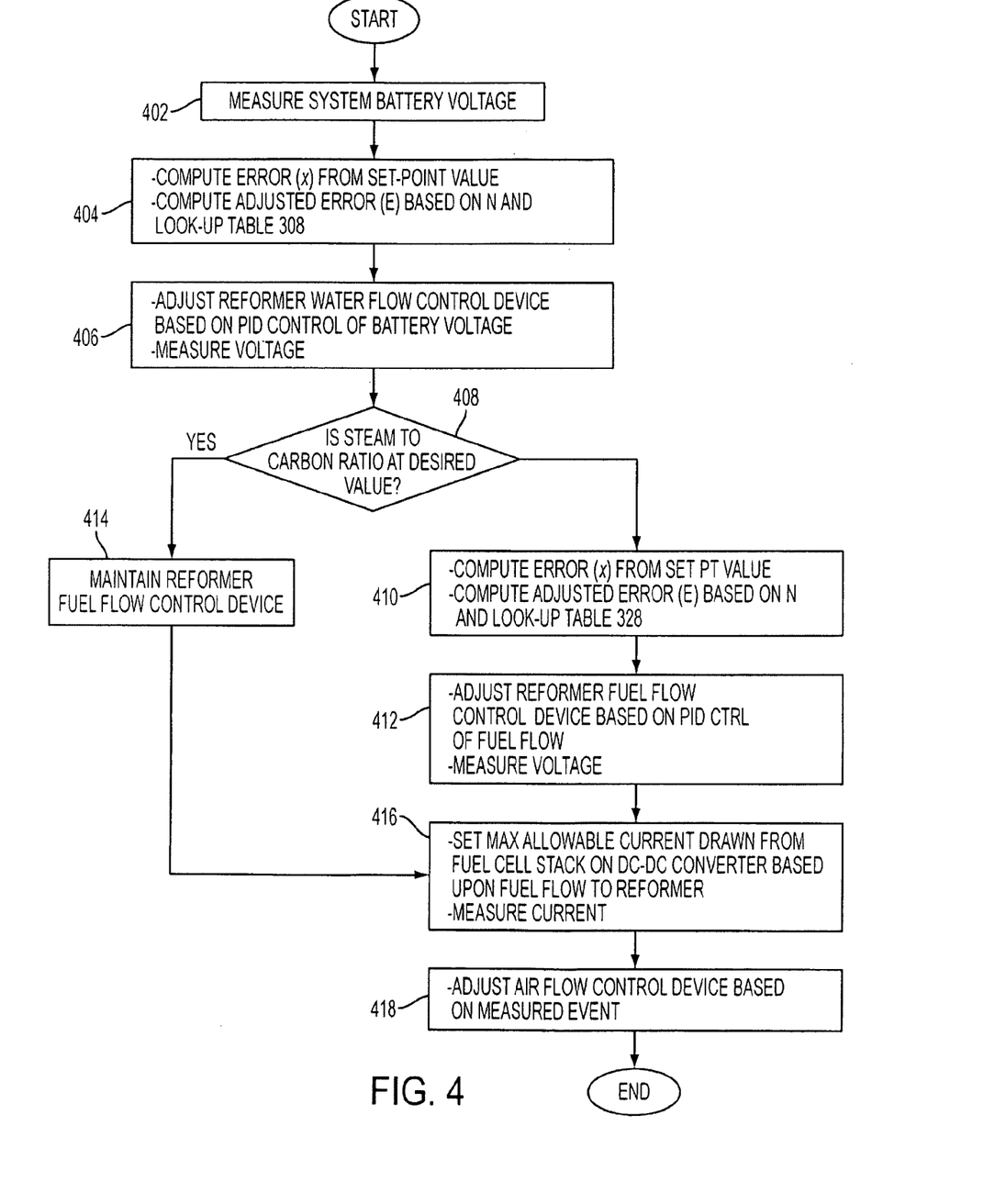
FIG. 4 shows, by way of a flow chart, an embodiment of a method to control a stationary power plant according to the present disclosure.

In particular, the cascading control routines, as described in further detail in FIG. 4, may further allow the system to reduce damage incurred by power plant components in the event of transient changes in battery voltage. For example, when the system battery voltage 302 drops below the desired set point 306, the control system adjusts the reforming capacity of the reformer 210 followed by adjusting the fuel cell capacity, thereby increasing the charging current 340 drawn from the fuel cell stack until the system battery voltage is within limits of the voltage set-point 306. By adjusting the reformer capacity in response to system battery voltage before adjusting the fuel cell stack capacity, the reformer capacity can lead the fuel cell stack capacity. The voltage-responsive lead in reformer capacity, in the given situation, maintains the presence of an adequate amount of hydrogen on the anode side of the fuel cell stack, such that, a transient drop in battery voltage can be managed by the control system by increasing the current drawn from the fuel cell stack/electrical buffer without incurring any damages to the fuel cell stack, or any other component of power plant 100.

The above operation can be contrasted to a current-responsive control system, for example. In the current-based system, the reformer reacts to the current drawn from the fuel cell stack in such that a transient drop in voltage would first lead to an increase in the current drawn from the fuel cell stack, followed by an appropriate adjustment of reformer capacity. In this approach, the response time involved in adjusting the reformer's water and fuel flow rates, adjusting the air flow rate, and regulation of system temperature levels, may be longer than desired. If the levels of hydrogen in the fuel cell are not adequate for the sudden surge in charging current being drawn from the fuel cell, it may lead to irreversible fuel cell damage.

In another example, if the battery voltage is greater than the desired voltage set-point, the control system of the present application commands a decrease in the charging current drawn from fuel cell stack 220 while the reformer lags in decreasing the reforming capacity. In this scenario, the voltage-induced lag in reformer capacity allows for a quick response to transient decreases in battery voltage. Thus, the implementation of a voltage-responsive lead or lag, as appropriate, in reformer capacity vis-à-vis the fuel cell stack capacity, allows the power plant control system to better react to current and/or voltage transients.

FIG. 4 shows a flow diagram depicting an embodiment of a method to control power plant 100 according to the present disclosure, such as by using the various control routines of FIG. 3. Method 400 first comprises, at 402, estimating the system battery voltage 302 (e.g., reading battery voltage measurement device 228). At 404, the method comprises determining the voltage error (x) between the measured battery voltage 302 and the voltage set-point 306. The error is fed into lookup table 308 which computes an adjusted error value E based on the input error x and a non-linear gain function, as described previously.

Method 400 also comprises at 406, adjusting the water flow control device 214, based on the computed adjusted error/deviation of measured battery voltage 304 from the set-point 306, via a command received from controller K1 310, as depicted in FIG. 3 routine 350. Further adjustments may be incorporated that are based on a bus-current dependent feed-forward control action received from lookup table 316. By adjusting the water supply to the fuel cell reformer via a feedback controller and based on a battery voltage error, and via a feed-forward bus-current dependent input, an appropriate response is generated to rectify deviations from the voltage set-point, without requiring excessive fuel storage or other resources.

Next, method 400 comprises at 408, analyzing the steam to carbon ratio, as depicted in FIG. 3 routine 360. An appropriate ratio of steam to carbon in the reformer 210 may allow for optimization of reformer capacity. In case of a deviation from set-point value 326, at 410 the error value x is further assessed in lookup table 328 to compute an adjusted error E before communication with the controller K2. Additional bus-current dependent feed-forward adjustments may also be incorporated, as shown in FIG. 3. The input allows for appropriate adjustment of fuel flow rate corresponding to the reformer steam flow rate at 412, thereby readjusting the steam to carbon ratio closer to the desired set-point 326. The feedback control loop depicted in routine 360 generates adjustments to the fuel supply which in turn can allow for an appropriate response to rectify deviations of the measured steam to carbon ratio from the predetermined set-point value 326. If no error is perceived at 408, the control system maintains the existing conditions of fuel flow into the reformer at 414.

Once the reformer capacity is adjusted by the control system, it may then proceed to appropriately coordinate the fuel cell stack's current generation capacity. Towards this effect, method 400 further comprises at 416, the setting on the DC-DC converter 104, the value of a maximum allowable current to be drawn from the fuel cell stack 220, as depicted in the upper branch of routine 370 in FIG. 3. The assigned value is based upon the rate of fuel flow to the reformer 210, which consequently affects the production of hydrogen-enriched fuel that is oxidized in the fuel cell stack 220. The charging current drawn from the fuel cell stack may be determined by current measurement device 226.

In this way, it is possible to integrate a voltage-responsive control system into stationary power plant 100 comprising a fuel cell stack 220, a reformer 210 that supplies hydrogen-enriched fuel, generated from a hydrocarbon raw fuel supply, into the fuel cell stack, and a battery management system, thereby enabling a swift response to and improved protection against transient power fluctuations. The control system may include a predetermined set-point for battery voltage. By adjusting set-points on the reformer and the fuel cell stack in a coordinated manner, the control system is able to monitor and maintain the battery voltage around the predetermined set-point 306. In one aspect, if it is determined by the voltage-responsive control system that the system battery voltage is below the desired set-point, the control system actuates a series of controls to provide the additional charging required for maintenance of the battery voltage. For example, by regulating the reformer water flow control device 214 alongside the fuel flow control device 204 using derivative controls, the reformer capacity can be adjusted without disturbing the requisite steam to carbon ratio.

In another aspect, by including a DC-DC controller hardware that ensures a maximum allowable current to be pulled from the fuel cell stack, based on the fuel flow to the reformer, the fuel cell capacity can be controlled. Additionally, the fuel cell stack capacity can be monitored by controlling the air flow control device 224 feeding the fuel cell stack in response to the charging current pulled from the fuel cell via a lookup table system 342. Additional incorporation of derivative control into the afore-mentioned control system may allow for improved transient response and disturbance rejection. By incorporating an appropriate lead or lag in the reforming capacity vis-a-vis the fuel cell capacity, it is possible to handle unexpected changes in the battery voltage.

Specifically, if it is determined by the control scheme that the battery voltage has reached the desired set-point, the DC-DC converter 104 may first lower the required charging current from the fuel cell stack 220, while the reformer 210 continues to overshoot, thereby allowing the system to react faster to battery voltage transients. Hence, by including a design that allows for overshoot on the reformer set-point but reduced undershoot, the control scheme is able to react faster to battery voltage transients. Employment of controllers that are primarily governed by feedback control mechanisms and the order of events in the cascading control routines further aid the control system to swiftly respond to minor fluctuations in current and voltage values from predetermined set-points, as explained in FIG. 3.

Note that the example control and estimation routines included herein can be used with various system configurations. The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, functions, or operations may be repeatedly performed depending on the particular strategy being used. Further, the described operations, functions, and/or acts may graphically represent code to be programmed into computer readable storage medium in the control system.

Figure 5:
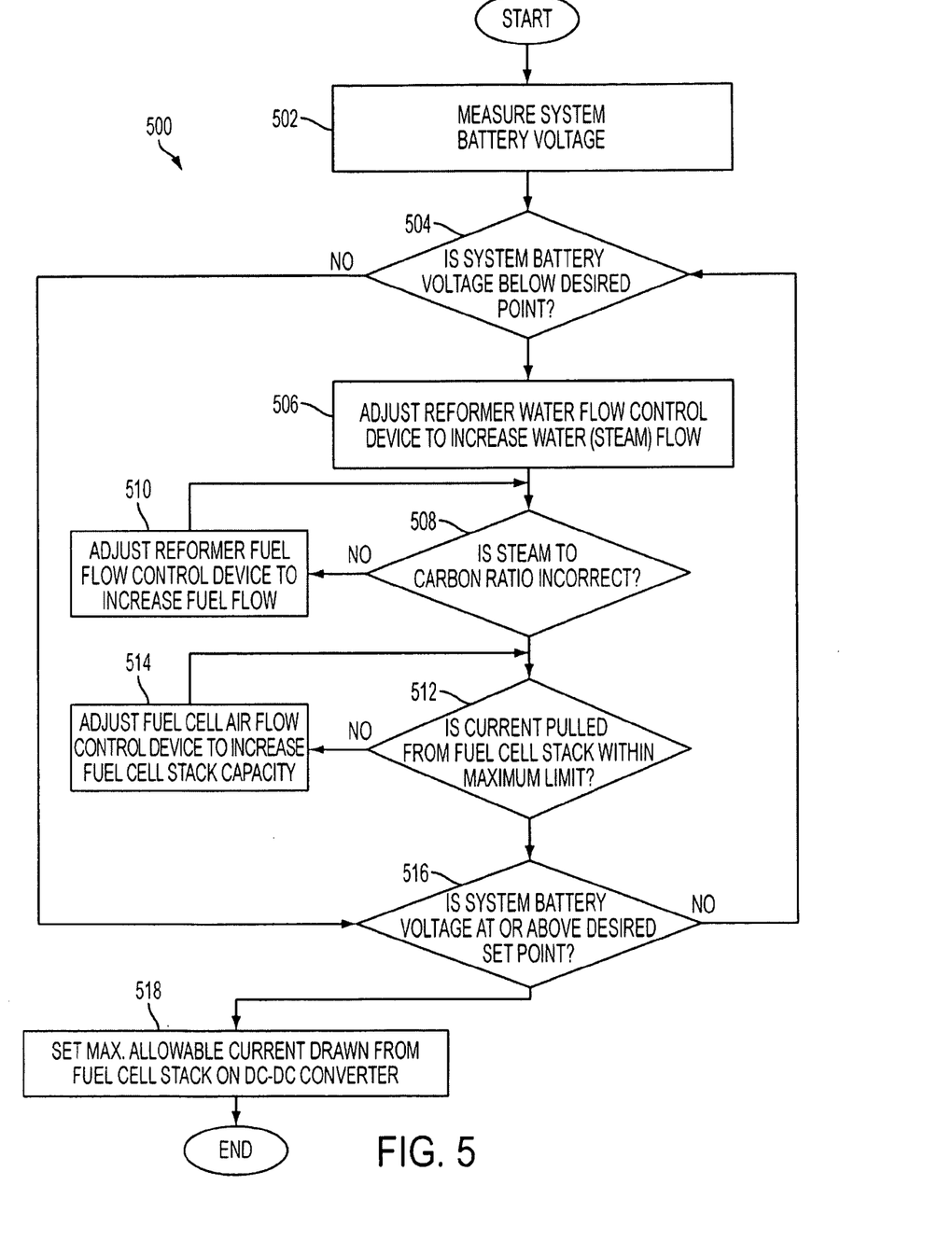
FIG. 5 shows, by way of a flow chart, a simplified description of the embodiment of the control system routine illustrated in FIGS. 3-4.

FIG. 5 shows a flow diagram depicting a simplified description of operation of the control system routines illustrated in FIGS. 3-4. Method 500 first comprises at 502, as indicated previously in FIG. 4 at 402, measuring the system battery voltage using battery voltage measurement device 228. Subsequently, at 504, method 500 comprises assessing whether the battery voltage is below the desired set-point value 306. If so, at 506, the error is processed via lookup table 308 and subsequently communicated with PID controller K1 which appropriately adjusts the reformer water flow control device 214 in order to increase the amount of water, in the form of steam, entering the reformer 210. This routine, 350, has been previously described in FIG. 3.

At 508, method 500 comprises assessing the steam to carbon ratio, based on measurements of water (steam) flow and fuel flow to the reformer. If correct, at 512, the method involves assessing the current drawn from the fuel cell stack, via current measurement device 226, and verification that it is within the maximum permissible limit upon comparison to the value in the current lookup table 342. If this is also within the permissible range, the charging current is used by the control system to charge the system buffer (battery). Consequently, at 516, the measured system battery voltage is again verified against predetermined set-point value 306. If, however, at 516 it is determined that the system battery voltage is now above the desired set-point, at 518, a maximum permissible value for current that can be drawn from fuel cell stack 220 is assigned on the DC-DC converter. In doing so, the control system may be able to reduce current surges that may have otherwise caused irreversible damage to power plant components. If the system battery voltage is still below the desired set-point value at 516, the control system then proceeds to repeat the events in the control loop starting from step 504 to ensure an appropriate charging current that can restore the system battery to its desired value.

On the contrary, if the steam to carbon ratio measured at 508 is incorrect, at 510, the reformer fuel flow control device 204 is adjusted via the PID controller K1. The initiation of feedback control routine 350 increases the amount of fuel flowing in to the reformer, and consequently amends the steam to carbon ratio. This permits improved utilization of reformer capacity. Alternately, if at 512 it is determined that the current drawn from the fuel cell stack is below the maximum permissible limit, then at 514 the fuel cell air flow control device is adjusted, as depicted in routine 370, in order to increase the current capacity of the fuel cell stack. The events at 506, 510 and 514 reflect the control system's concerted effort to increase the charging current drawn from the fuel cell by better managing both reformer and fuel cell capacities. The increase in charging current is then expected to allow recharging of the system buffer battery.

In this way, a voltage-responsive power plant control system that includes an electrical buffer and modulates the system components to control system battery voltage, is able to better handle any disturbances. In contrast to current-responsive higher-gain control systems that may over-react and are expensive, the voltage-responsive lower-gain control system described herein may be able to handle transients in an improved and cost-effective manner. The use of a system battery to dampen the response time of the electronic controller may also protect power plant components, for example the reformer, from sudden surges in current. In one, the AC power from the system inverter may be harnessed if the power generated from the power plant does not suffice. In this aspect, the incorporation of a system battery may also allow for the protection of the system inverter from irreversible damage in the event of a temporary surge current. By incorporating a buffer system in the form of a relatively small battery, the control system is able to maintain sufficient fuel cell anode inventory of hydrogen without requiring an excessively large buffer of fuel, thereby obviating costs related to excessive fuel, additional fuel storage and related resources. The robustness of the power plant control system in the managing of transients may also obviate the need for a larger buffer system such as a large battery system or supercapacitors. While the control system may be able to balance the dynamic response to transients with a smaller buffer battery, the present approach in controlling power plants may also be applicable with larger buffer systems.

The invention claimed is:

1. A method of operating a power generating system including a fuel cell coupled to an electrical buffer, wherein the fuel cell is further coupled to a steam reformer, comprising:
adjusting operation of the reformer by adjusting a water flow to the reformer to maintain a voltage of the electrical buffer at a predetermined voltage set-point by adjusting a water flow control device responsive to an error between the voltage and the predetermined voltage set point while maintaining s steam to carbon ratio of the reformer at a steam to carbon ratio set-point by adjusting a fuel flow to the reformer to control charging of the electrical buffer by the fuel cell including adjusting a fuel flow control device responsive to an error between the steam to carbon ratio and the steam to carbon ratio set-point.

2. The method of claim 1 further comprising for increased power demand by providing current from the electrical buffer before a fuel cell current is increased by the adjusting of the water flow and the fuel flow of the reformer.

3. The method of claim 1 wherein the electrical buffer is coupled to the fuel cell via a DC bus, and wherein the electrical buffer includes a battery, and wherein the adjusting of the water flow is responsive to a voltage of the DC bus.

4. The method of claim 1, wherein adjusting the water flow includes increasing the water low to the reformer in response to a decrease in the voltage of the electrical buffer from the predetermined voltage set-point.

5. The method of claim 1 further comprising adjusting a mode of a DC-DC converter coupled to the power generating system based on a charging current generated by the fuel cell.

6. The method of claim 4, wherein the fuel flow to the reformer is increased responsive to the increase in the water flow, to maintain the steam to carbon ratio at the steam to carbon ratio set-point.

7. The method of claim 1 further comprising adjusting an air flow of the fuel cell responsive to a charging current generated by the fuel cell.

8. The method of claim 1, further comprising adjusting air flow of the fuel cell responsive to a charging current generated by the fuel cell while the water flow to the reformer is adjusted responsive to the voltage of the electrical buffer, and while the fuel flow to the reformer is adjusted responsive to the steam to carbon ratio.

9. A power generating system, comprising;

a fuel cell stack;

a reformer coupled to the fuel cell stack providing hydrogen enriched fuel to the fuel cell stack;

a raw fuel supply supplying raw fuel to the reformer;

a water supply supplying water to the reformer;

an air supply supplying air to the fuel cell stack;

a voltage bus electrically coupled to the fuel cell stack;

a battery system electrically coupled to the voltage bus; and a control system configured to, in response to a load applied on the power generating system, increase the water supplied to the reformer to maintain a voltage of the voltage bus at a predetermined voltage set-point by adjusting the water supplied responsive to an error between the voltage and the predetermined voltage set-point; and increase a raw fuel supplied to the reformer responsive to the increased water supplied to the reformer to maintain a steam to carbon ratio by adjusting the raw fuel supplied responsive to an error between the steam to carbon ratio and a steam to carbon ratio set-point, wherein the control system further adjusts the air supplied to the fuel cell responsive to a charging current generated by the fuel cell, and wherein the water supplied to the reformer and the raw fuel supplied to the reformer are adjusted independent from the charging current.

10. The power generating system of claim 9 further comprising a DC-DC converter electrically coupled to the voltage bus, wherein the voltage bus is DC voltage bus, and wherein the fuel cell stack is electrically coupled to the DC voltage bus through the DC-DC converter.

11. The power generating system of claim 10 wherein the control system further adjusts an operation of the DC-DC converter responsive to the charging current.

12. The power generating system of claim 11 wherein the power generating system is coupled to a stationary power plant.

13. A method of operating a power generating system including a fuel cell stack coupled to an electrical buffer through a DC-DC converter and a DC voltage bus, wherein the fuel cell stack is further coupled to a steam reformer, comprising:

in response to an applied load to the power generating system, adjusting operation of the reformer to maintain the DC voltage bus at a predetermined voltage set-point while also maintaining a steam to carbon ratio of the reformer at a predetermined steam to carbon ratio set-point, wherein the adjusting includes increasing an amount of water supplied to the reformer based on a deviation of an actual voltage of the DC voltage bus from the predetermined voltage set-point, and increasing an amount of raw fuel supplied to the reformer based on a deviation of an actual steam to carbon ratio from the predetermined steam to carbon ratio set-point.

14. The method of claim 13 further comprising compensating for an increased power demand by providing current from the electrical buffer before a fuel cell current is increased by the adjusting operation of the reformer.

15. The method of claim 3, further comprising providing a feed-forward control of the water flow to the reformer based on a measured bus current.

16. The method of claim 15, further comprising providing a feed-forward control of the fuel flow to the reformer based on the measured bus current.

* * * * *